Patented Nov. 18, 1941

2,263,386

UNITED STATES PATENT OFFICE 2,263,386

ISOTHIOCYANATES OF AROMATIC ETHERS

William F. Hester, Drexel Hill, Pa., assignor to Röhm & Haas Company, Philadelphia, Pa.

No Drawing. Application March 26, 1940, Serial No. 326,046

5 Claims. (Cl. 260—454)

This invention concerns isothiocyanates of aromatic ethers. In particular it deals with isothiocyanates of diphenyl and benzyl phenyl ethers and thioethers. These ether derivatives have been found to possess higher insecticidal activity, more favorable solubility, and less odor than simple aromatic isothiocyanates.

The object of this invention is to provide isothiocyanates of aromatic ethers. Another object is to provide a simple method for preparing these compounds.

The isothiocyanates of aromatic ethers may be prepared from the analogous nitro compounds of aromatic ethers, which are already known, by reduction to the corresponding amine and reaction with carbon disulfide under conditions which provide for the removal of hydrogen sulfide. Alternatively, where amines are at hand, only the reaction with carbon disulfide is required.

A nitro aromatic ether is most conveniently reduced with hydrogen in the presence of a catalyst, such as nickel. The free amine may then be reacted with carbon disulfide in the presence of an alkali hydroxide. A solution of a salt of a metal forming an insoluble sulfide, such as silver or lead nitrate, is then added and the resulting solid products separated and dried. The isothiocyanate may be extracted from the solids with an organic solvent at this point, but it is preferable to allow the solids to be exposed to air for several days. Extraction is then performed.

As illustrative of this method the following examples are given:

Example 1

A solution of 115 g. of $C_6H_5CH_2OC_6H_4NO_2$—4 in 200 ml. of isopropanol was reduced with hydrogen in the presence of Raney nickel catalyst to give the amine, which had a melting point of 56° C. The amine was purified by conversion to the hydrochloride, which was recrystallized from dioxane. The hydrochloride had a melting point of 230–231° C. After purification the amine salt was converted to the free amine.

A mixture was made of 40 g. of the free amine, 60 g. of carbon disulfide, and 240 ml. of water. There was then slowly stirred into the mixture 16 g. of a 50% solution of sodium hydroxide. The reaction mixture was cooled during this addition. Stirring was continued for four hours and the reaction mixture was treated with a solution containing 70 g. of lead nitrate in 400 ml. of water. 40 g. of precipitated calcium carbonate was also added. The solid material from the reaction was filtered off and air-dried for several days. It was then ground and extracted several times with acetone. As the acetone was evaporated, the isothiocyanate separated. When this compound was recrystallized from petroleum ether, it had a melting point of 60° C. and a nitrogen content of 5.74%, which corresponded closely to the theoretical nitrogen content of $C_6H_5CH_2OC_6H_4NCS$ (5.81%).

There was also obtained a small amount of a product having a melting point of about 207° C. and corresponding to $(4-C_6H_5CH_2OC_6H_4NH)_2CS$.

Example 2

A solution of $4-NO_2C_6H_4OC_6H_5$ in isopropanol was reduced by hydrogen in the presence of Raney nickel. The amine thus obtained was recrystallized from petroleum ether and then had a melting point of 83° C.

To a mixture consisting of 50 g. of this amine, 80 g. of carbon disulfide, and 300 ml. of water there was slowly added 21.6 g. of a 50% sodium hydroxide solution. The mixture was cooled and stirred during the mixing. It was left standing overnight and then treated with 95 g. of lead nitrate in 400 ml. of water. 55 g. of precipitated calcium carbonate was also added. This mixture was stirred for an hour and the solid material separated by filtration. This was air-dried for several days and extracted with acetone. The acetone extract was concentrated and the product obtained as crystals which, purified by crystallization from petroleum ether, gave the isothiocyanate, $C_6H_5OC_6H_4NCS$—4, which had a melting point of 42° C. There was also obtained material of the formula $(C_6H_5OC_6H_4NH)_2CS$, having a melting point of 170° C.

The isothiocyanate ethers were tested for insecticidal activity by taking up one part of each product in one part of oil-soluble sulfonated petroleum oil and two parts of pine oil. This preparation was emulsified in water as a spray to give an effective concentration of one part of the active agent in 1200 parts of water, and applied to growing plants infested with insects. Counts of insects were made 48 hours after spraying.

The isothiocyanate of benzyl phenyl ether gave a kill of 99% of red spiders on bush beans and a kill of 100% of mealy bugs on coleus. The isothiocyanate of diphenyl ether gave a kill of 100% of red spiders on bush beans and a kill of 85% of mealy bugs on coleus. A spray with this toxicant at 1:1600 was applied to cabbage infested with green aphis with a kill of 84% but with some injury to this kind of plant. A 2% solution of $C_6H_5CH_2OC_6H_5NCS$—4 in kerosene was tested against flies by the Peet-Grady method with a knock-down of 80% and a kill of 52%. The preparation possessed but slight odor and was not irritating.

By the method of preparation described above there may be prepared in additon to $$C_6H_5CH_2OC_6H_4NCS—4$$

and $C_6H_5OC_6H_4NCS$—4 the following compounds:

$C_6H_5CH_2OC_6H_4NCS$—2
$C^6H_5CH_2OC_6H_3(NCS)_2$—2,4
$C_6H_5CH_2OC_6H_3NCS$—2—Cl—4
$C_6H_5CH_2OC_6H_2(NCS)_2$—2,6—
$C(CH_3)_2CH_2C(CH_3)_2$—4
$C_6H_5CH_2OC_6H_3CH_3$—2—NCS—4
4—$SCNC_6H_4CH_2OC_6H_4C(CH_3)_3$—4
4—$SCNC_6H_4CH_2OC_6H_4CH_3$—4
$C_6H_5CH_2SC_6H_4NCS$—4
$C_6H_5CH_2SC_6H_3(NCS)_2$—2,4
$C_6H_5CH_2SCH_2C_6H_4NCS$—4
$C_6H_5OC_6H_4NCS$—2
$C_6H_5OC_6H_3(NCS)_2$—2,4
2—$CH_3C_6H_4OC_6H_4NCS$—4
3—$CH_3C_6H_4OC_6H_4NCS$—4
$(CH_3)_2C_6H_3OC_6H_4NCS$—4
4—$(CH_3)_3CC_6H_4OC_6H_4NCS$—4
4—$(CH_3)_3CC_6H_4OC_6H_4NCS$—2
4—$(CH_3)_3CCH_2(CH_3)_2CC_6H_4OC_6H_4NCS$—4
$C_6H_5C_6H_4OC_6H_4NCS$—4
4—$ClC_6H_4OC_6H_4NCS$—4
2—$ClC_6H_4OC_6H_4NCS$—4
2—SCN—4—$ClC_6H_3OC_6H_3(NCS)_2$—2,4
$C_6H_5SC_6H_4NCS$—4
$CH_3C_6H_4SC_6H_4NCS$—4
4—$ClC_6H_4SC_6H_4NCS$—4

These compounds may be represented by the general formula $$(NCS)_m ArOAr(NCS)_n$$

where Ar is a phenyl or benzyl group, $m$ has a value of 0, 1, or 2, and $n$ is an integer having a value of 1 or 2.

I claim:
1. Isothiocyanates of aromatic ethers selected from the group consisting of phenoxybenzene, phenyl thiobenzene, benzyloxy benzene, and benzyl thiobenzene.
2. An isothiocyanate of a phenoxy benzene.
3. 4-phenoxyphenyl isothiocyanate.
4. An isothiocyanate of a phenyl benzyl ether.
5. 4-benzyloxyphenyl isothiocyanate.

WILLIAM F. HESTER.